United States Patent
Mullaly et al.

(10) Patent No.: US 9,892,294 B2
(45) Date of Patent: Feb. 13, 2018

(54) SYSTEMS AND METHODS FOR JOB SITE MANAGEMENT

(71) Applicant: HOME DEPOT PRODUCT AUTHORITY, LLC, Atlanta, GA (US)

(72) Inventors: Mark Mullaly, Kennesaw, GA (US); Kathryn Burrow, Ellenwood, GA (US); Larissa Green, College Park, GA (US)

(73) Assignee: Home Depot Product Authority, LLC, Atlanta, GA (US)

( * ) Notice: Subject to any disclaimer, the term of this patent is extended or adjusted under 35 U.S.C. 154(b) by 73 days.

(21) Appl. No.: 13/800,922

(22) Filed: Mar. 13, 2013

(65) Prior Publication Data
US 2014/0266595 A1 Sep. 18, 2014

(51) Int. Cl.
*G06K 7/10* (2006.01)
*G06Q 10/10* (2012.01)
G07C 1/10 (2006.01)
G07C 1/14 (2006.01)
G06Q 20/38 (2012.01)

(52) U.S. Cl.
CPC ..... *G06K 7/10366* (2013.01); *G06Q 10/1053* (2013.01); *G06Q 20/382* (2013.01); *G07C 1/10* (2013.01); *G07C 1/14* (2013.01)

(58) Field of Classification Search
CPC ........ G07C 1/10; G07C 9/00111; G07C 1/14; G06Q 20/382
USPC ...... 340/5.7, 5.8, 5.81; 705/32, 50; 235/382, 235/377
See application file for complete search history.

(56) References Cited

U.S. PATENT DOCUMENTS

| | | | |
|---|---|---|---|
| 5,497,141 A * | 3/1996 | Coles et al. | 340/309.7 |
| 6,751,650 B1 | 6/2004 | Finch, II et al. | 709/203 |
| 7,222,241 B2 * | 5/2007 | Milgramm et al. | 713/186 |
| 7,770,013 B2 | 8/2010 | Rhoads et al. | 713/176 |
| 7,898,421 B2 * | 3/2011 | Foxx et al. | 340/572.8 |
| 8,001,160 B2 | 8/2011 | Weisflog | 707/802 |
| 8,060,394 B2 | 11/2011 | Woodings et al. | 705/7.13 |
| 8,086,632 B2 | 12/2011 | Olson | 707/781 |
| 2001/0049615 A1 | 12/2001 | Wong et al. | 705/7.14 |
| 2002/0175211 A1 * | 11/2002 | Dominquez et al. | 235/492 |
| 2003/0101070 A1 | 5/2003 | Mahosky et al. | 705/26.1 |
| 2003/0115198 A1 | 6/2003 | Singer et al. | |
| 2004/0267606 A1 | 12/2004 | Brishke | 705/321 |
| 2005/0021350 A1 | 1/2005 | Scott et al. | 705/320 |
| 2006/0074740 A1 | 4/2006 | Garcia et al. | 705/7.14 |
| 2006/0087410 A1 * | 4/2006 | Garcia et al. | 340/309.16 |
| 2006/0106624 A1 | 5/2006 | Hardin et al. | 705/1.1 |

(Continued)

FOREIGN PATENT DOCUMENTS

JP 2006190043 7/2006

OTHER PUBLICATIONS

MyBuildingPermit.com, 2008 [retrieved on Feb. 1, 2012]. Retrieved from the Internet: <URL: http://www.mybuildingpermit.com>.

(Continued)

*Primary Examiner* — Mohamed Barakat
(74) *Attorney, Agent, or Firm* — Greenberg Traurig, LLP (57) ABSTRACT

Systems and methods for job site management, such as those, for example, configured validate a worker, clock-in a worker, clock-out a worker, detect a geographic location of a worker, provide information relating to a worker, and the like.

20 Claims, 2 Drawing Sheets

(56) References Cited

U.S. PATENT DOCUMENTS

| | | | |
|---|---|---|---|
| 2007/0000992 A1* | 1/2007 | Ginskey et al. | 235/377 |
| 2008/0114683 A1* | 5/2008 | Neveu et al. | 705/50 |
| 2008/0177646 A1* | 7/2008 | Frink | 705/32 |
| 2009/0132269 A1 | 5/2009 | Perrill | 705/311 |
| 2011/0022531 A1 | 1/2011 | Jordan | 705/321 |
| 2011/0215911 A1 | 9/2011 | Cassels et al. | 340/10.4 |
| 2012/0078924 A1 | 3/2012 | Woodings et al. | 707/754 |
| 2012/0112880 A1 | 5/2012 | Meyers | 340/5.54 |
| 2013/0059603 A1 | 3/2013 | Guenec et al. | |
| 2013/0093563 A1* | 4/2013 | Adolfsson et al. | 340/5.7 |
| 2013/0185172 A1 | 7/2013 | Mullaly | 705/36.41 |
| 2013/0198049 A1* | 8/2013 | Burns | G06Q 10/1091 705/32 |

OTHER PUBLICATIONS

Office Action received in Canadian Counterpart Application 2,835,590 dated Jul. 28, 2016.

* cited by examiner

SYSTEMS AND METHODS FOR JOB SITE MANAGEMENT

BACKGROUND OF THE INVENTION

1. Field of the Invention

This disclosure generally relates to management systems and methods, and more particularly, but not by way of limitation, to systems and methods for job site management, such as those, for example, configured to validate a worker, clock-in a worker, clock-out a worker, detect a geographic location of a worker, provide information relating to a worker, and the like.

2. Description of the Related Art

Examples of management systems are disclosed, for example, in U.S. Pat. Nos. 8,251,287 and 7,770,013, U.S. Patent Publication No. 2005/0021350, and Japanese Patent Publication No. 2006-190043.

SUMMARY OF THE INVENTION

This disclosure includes embodiments of worker verification systems and, in some specific embodiments, job site management systems. For example, embodiments of such systems comprise a badge comprising an identifier configured to associate the badge with information relating to a worker in the system. In some embodiments, the identifier comprises a matrix bar code, a linear bar code, and/or a radio frequency identification tag. In some embodiments, the identifier is a visual identifier and is visible, for example, on the face of the badge; and in other embodiments, the identifier may be a non-visual identifier and is, for example, embedded in the badge such that the identifier is not directly visible on the badge.

In some embodiments, the system comprises one or more processors configured to: determine whether to validate a worker having the badge after a first device (e.g., a mobile phone, a smart phone, a tablet, and a laptop computer) interfaces with the identifier and sends a signal relating to the identifier; clock-in the worker having the badge if the system receives a first signal relating to the identifier from a second device (e.g., a mobile phone, a smart phone, a tablet, and a laptop computer); and clock-out the worker having the badge if the system receives a second signal relating to the identifier from the second device. In some embodiments, the first signal and the second signal from the second device can be the same signal. In some embodiments, the system is configured to detect the time at which the first signal from the second device is received and the time at which the second signal from the second device is received.

In some embodiments, the system comprises one or more processors configured to: determine whether to validate a worker having the badge after a first device interfaces with the identifier and sends a signal relating to the identifier; and detect the worker's geographic location based on a signal received from a second device. In some embodiments, the one or more processors are configured to determine whether to validate a worker by comparing information linked to the identifier with information in the system. In other embodiments, the system is configured such that if the system receives a signal from a first device, the system provides information relating to the worker to a second device.

In some embodiments, a worker database is coupled to the one or more processors, and the worker database comprises information relating to a worker, such as worker name, age, address, employer affiliations, contractor affiliations, licenses, certifications, background checks, educational history, and employment history. In some embodiments, the system is configured to allow a first worker to customize information relating to the first worker in the worker database; and in some embodiments, the system is configured to allow a first worker to input information relating to the first worker into the worker database. In some embodiments, the one or more processors are configured to provide information from the worker database relating to a worker for display on at least one of the first and second devices.

In some embodiments, a scheduling database is coupled to the one or more processors, and the scheduling database comprises information relating to a schedule of a worker, such as worker name, date of a scheduled job, time of a scheduled job, and geographic location of a scheduled job. In some embodiments, the one or more processors are configured to determine whether to validate a worker by comparing information linked to the identifier with information in the scheduling database. In some embodiments, the system is configured to allow an administrator to customize information relating to the worker in the scheduling database; and in some embodiments, the system is configured to allow an administrator to input information relating to the worker into the scheduling database. In some embodiments, the one or more processors are configured to provide information from the scheduling database relating to a worker for display on at least one of the first and second devices.

In some embodiments, a customer database is coupled to the one or more processors, and the customer database comprises information relating to a customer, such as customer names, industry types, addresses, telephone numbers, scheduled jobs, dates of scheduled jobs, times of scheduled jobs, geographic locations of a scheduled jobs, parts usage and/or equipment usage, job site requirements (e.g., license, background, or certification requirements), contract information (e.g., warranties or coverage), and similar customer-specific information. In some embodiments, the system is configured to allow an administrator and/or a customer to customize information relating to the customer in the customer database; and in some embodiments, the system is configured to allow an administrator and/or a customer to input information relating to the customer into the customer database. In some embodiments, the one or more processors are configured to provide information from the customer database relating to a customer for display on at least one of the first and second devices.

This disclosure includes embodiments of worker verification methods and, in some specific embodiments, job site management methods. For example, embodiments of such methods comprise receiving a signal comprising information relating to a worker from a first device; receiving a first signal comprising information relating to the worker from a second device; determining whether to validate the worker based on the signal received from the first device; providing information relating to the worker to the first device; and clocking-in the worker based on the first signal received from the second device. In some embodiments, the methods comprise receiving a second signal comprising information relating to the worker from the second device; and clocking-out the worker based on the second signal received from the second device. The methods can further comprise detecting a geographic location of the worker based on at least one of the first signal and the second signal received from the second device. In some embodiments, the signal comprising information relating to the worker is received from the first device if the first device interfaces with an identifier. In some embodiments, the first signal comprising information relating to the worker is received from the second device if the second device interfaces with an identifier; and in some embodiments, the second signal comprising information relating to the worker is received from the second device if the second device interfaces with an identifier.

The terms "coupled" and "interface" are defined as connected, although not necessarily directly, and not necessarily mechanically or electrically. Two items are "couplable" or interfaceable if they can be coupled to or interfaced with each other. Unless the context explicitly requires otherwise, items that are couplable are also decouplable, and vice-versa. One non-limiting way in which a first structure is couplable or interfaceable to a second structure is for the first structure to be configured to be coupled to or configured to be interfaced with the second structure.

The terms "a" and "an" are defined as one or more unless this disclosure explicitly requires otherwise.

The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, or a component of a system, that "comprises," "has," "includes" or "contains" one or more elements or features possesses those one or more elements or features, but is not limited to possessing only those elements or features. Likewise, a method that "comprises," "has," "includes" or "contains" one or more steps possesses those one or more steps, but is not limited to possessing only those one or more steps. Additionally, terms such as "first" and "second" are used only to differentiate structures or features, and not to limit the different structures or features to a particular order.

The terms "detect" (and any form of detect, such as "detects," "detected," and "detecting") and "determine" (and any form of determine, such as "determines," "determined," and "determining") are used broadly throughout this disclosure to include receiving information, obtaining or gathering of information, and any calculations for and/or manipulations of such information that may result in additional information. Such terms should include terms such as measuring, identifying, receiving, obtaining, gathering, similar terms, and derivatives of such terms.

Any embodiment of any of the systems and methods can consist of or consist essentially of—rather than comprise/include/contain/have—any of the described elements, features, and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The feature or features of one embodiment may be applied to other embodiments, even though not described or illustrated, unless expressly prohibited by this disclosure or the nature of the embodiments.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures illustrate at least some of the described elements using graphical symbols that will be understood by those of ordinary skill in the art.

DESCRIPTION OF ILLUSTRATIVE
EMBODIMENTS

Some embodiments of the job management systems described herein are configured to assist in the identification, authorization, and management of workers at a job site. For example, the systems can be configured to do one or more of the following: validate a worker, clock-in and clock-out a worker, detect a geographic location of a worker, and provide information relating to a worker to mobile devices. Such systems can assist in ensuring that workers having appropriate credentials, skill sets, and/or authorizations are present at appropriate job sites at the appropriate date and time. Whether a worker is present at an appropriate job site and at the appropriate date and time can be predetermined (e.g., by worker schedules) or can occur dynamically based on information in the system or information input/altered in the system by an administrator. Further, some embodiments of these systems are configured to permit real-time/live communication, such as over radio frequencies, with devices such as mobile phones, laptop computers, tablets, and the like. For example, a worker can be an employee, agent, or independent contractor hired by an entity to perform work for a customer of the entity or a customer of a third party (such as a general contractor) with which the entity does business. Such systems permit the identification, authorization, and/or management of the worker by the customer, by the entity, and by third parties, such as a general contractor also working at the job site, by, for example, validating one or more credentials of the worker, by clocking-in/clocking out the worker, and the like.

Figure 1:
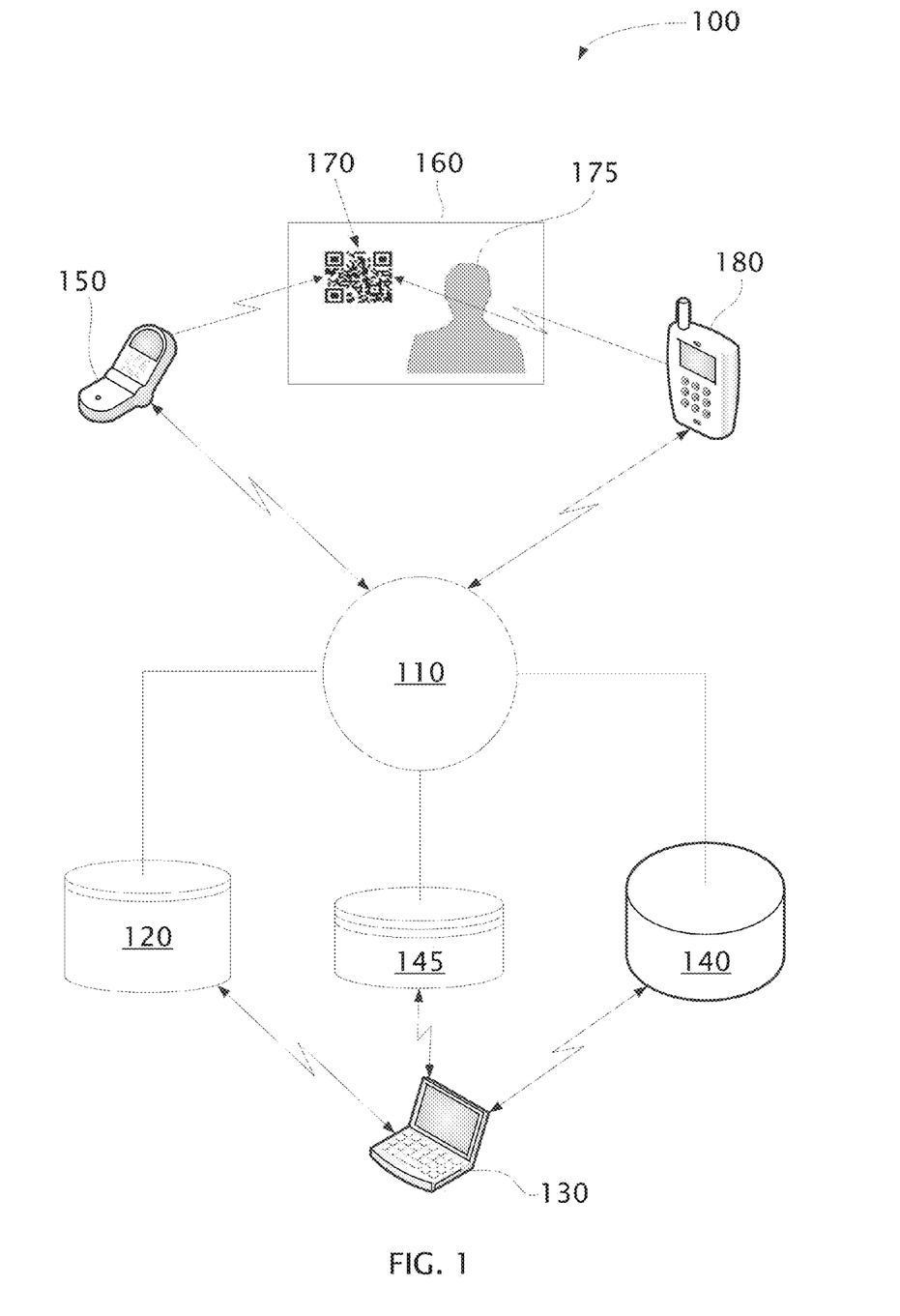
FIG. 1 depicts one embodiment of a job site management system having one processor.
Figure 2:
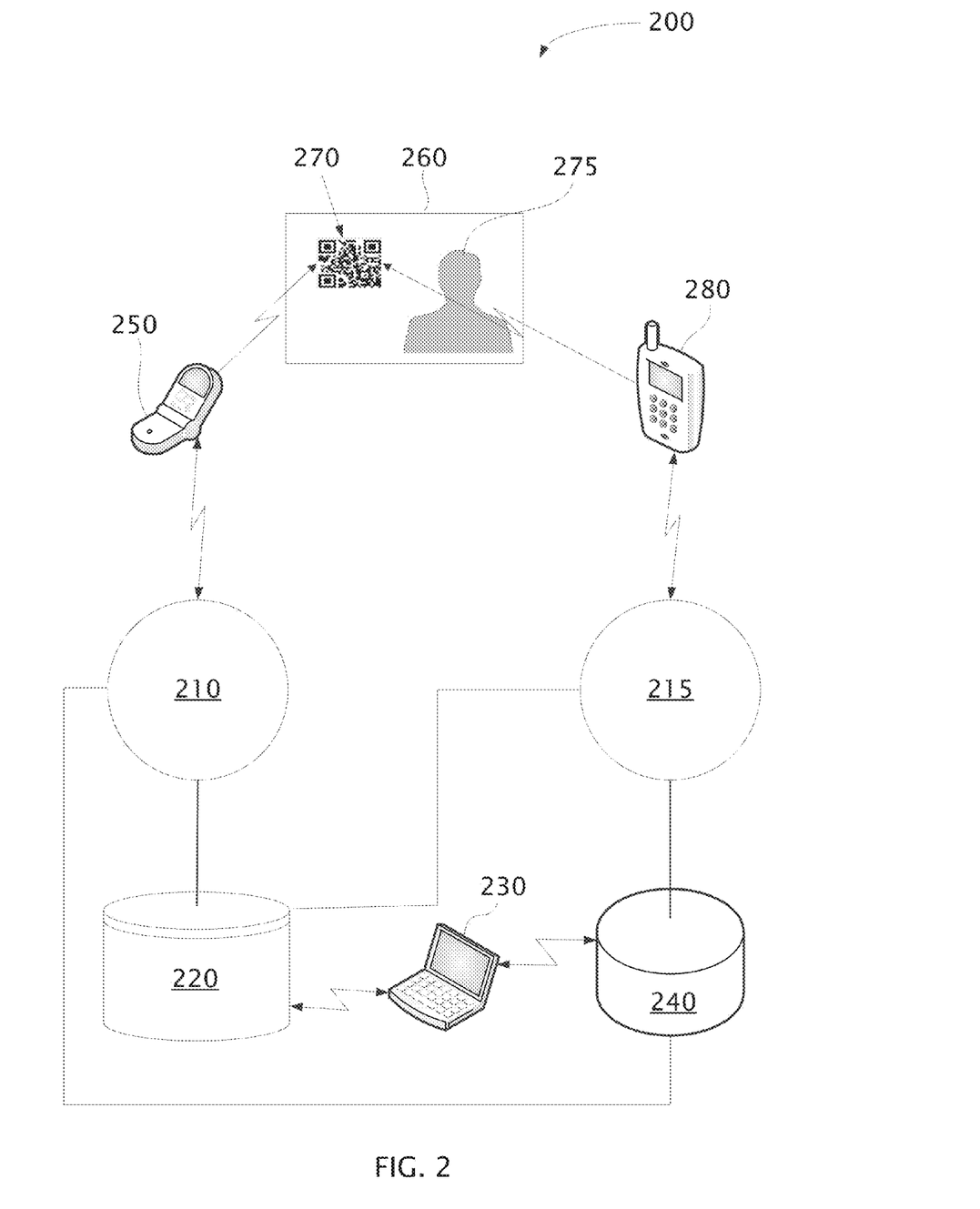
FIG. 2 depicts another embodiment of a job site management system having more than one processor.

FIGS. 1-2 depict examples of systems suited for performing one or more of these functions using one or more processors. In particular, system 100 in FIG. 1 has one processor 110, and system 200 in FIG. 2 has two processors 210 and 215. The characteristics of systems 100 and 200 and the functions these processors can perform are described below. In other embodiments, the systems and methods can comprise any number of processors that permit the systems and methods to have the same or similar characteristics and perform the same or similar functions as described in this disclosure.

The term "processor" is used generally throughout this disclosure to describe any device capable of performing the functions described in this disclosure. For example, the functions may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Referring now to FIG. 1, system 100 comprises processor 110 that is coupled to worker database 120. Processor 110 can be coupled directly to worker database 120 (e.g., as depicted in FIG. 1) or indirectly to worker database 120 (e.g., such that a signal from processor 110 passes through one or more other components of system 100 prior to reaching worker database 120). Further, processor 110 and worker database 120 can be coupled in any suitable way, including via a wireless and/or wired connection and the corresponding components.

Worker database 120 is configured to comprise (e.g., store, save, accommodate, and/or hold, and even if only transiently) information relating to a worker, such as an employee, an independent contractor, and the like. For example, worker database 120 can have information such as one or more of worker names; ages; photographs; physical characteristics, such as height, eye color, hair color, and weight; addresses; employer affiliations; contractor affiliations; licenses; certifications; background check information; educational history; and employment history. Worker database 120 can also comprise information relating to a worker's schedule, including one or more of types of scheduled jobs, dates of scheduled jobs, times of scheduled jobs, geographic locations of scheduled jobs, and similar job-specific information. A database that comprises (e.g., stores) information may be more specifically characterized as comprising (e.g., storing) data representative of the information.

In some embodiments, system 100 is configured such that a worker can input and/or customize (e.g., edit) information relating to the worker or the worker's schedule in worker database 120, such as via a device 130, which can comprise a computer, tablet, smart phone, and the like. In some embodiments, system 100 is configured such that an administrator, employer, contractor, or other authorized personnel can input and/or customize information relating to workers or worker schedules in worker database 120, such as via a device 130.

As depicted in FIG. 1, system 100 also comprises scheduling database 140, which is coupled to processor 110. As with worker database 120, processor 110 can be coupled directly to scheduling database 140 (as depicted in FIG. 1) or indirectly, in the manner described above. Further, processor 110 and scheduling database 140 can be coupled in any suitable way, including via a wireless and/or wired connection and the corresponding components. Scheduling database 140 is configured to have information relating to a worker's schedule. For example, scheduling database 140 can have information such as one or more of worker names; types of scheduled jobs, dates of scheduled jobs, times of scheduled jobs, geographic locations of a scheduled jobs, and similar job-specific information. In some embodiments, scheduling database 140 can comprise similar information to worker database 120, including one or more of worker ages; photographs; physical characteristics, such as height, eye color, hair color, and weight; addresses; employer affiliations; contractor affiliations; licenses; certifications; background check information; educational history; and employment history. In other embodiments, scheduling database 140 is not a part of the system, and worker database 120 can perform some or all of the functions of scheduling database 140.

In some embodiments, system 100 is configured such that a worker can input and/or customize (e.g., edit) information relating to the worker or the worker's schedule in scheduling database 140, such as via a device 130. In some embodiments, system 100 is configured such that an administrator, employer, contractor, or other authorized personnel can input and/or customize information relating to workers or worker schedules in scheduling database 140, such as via a device 130.

System 100 also can comprise customer database 145, which is coupled to processor 110. As with worker database 120 and scheduling database 140, processor 110 can be coupled directly to customer database 145 (as depicted in FIG. 1) or indirectly, in the manner described above. Further, processor 110 and customer database 145 can be coupled in any suitable way, including via a wireless and/or wired connection and the corresponding components. Customer database 145 is configured to have information relating to customers (e.g., a customer owning a job site to which a worker is sent). For example, customer database 145 may have information such as customer names, industry types, addresses, telephone numbers, scheduled jobs, dates of scheduled jobs, times of scheduled jobs, geographic locations of a scheduled jobs, parts usage and/or equipment usage, job site requirements (e.g., license, background, or certification requirements), contract information (e.g., warranties or coverage), and similar customer-specific information. In some embodiments, customer database 145 can comprise similar information to worker database 120 (e.g., if a worker is assigned to a specific customer), including one or more of worker ages; photographs; physical characteristics, such as height, eye color, hair color, and weight; addresses; employer affiliations; contractor affiliations; licenses; certifications; background check information; educational history; and employment history. In other embodiments, customer database 145 is not a part of the system, and worker database 120 and/or scheduling database 140 can perform some or all of the functions of customer database 145.

In some embodiments, system 100 is configured such that a customer can input and/or customize (e.g., edit) information relating to the customer in customer database 145, such as via a device 130. In some embodiments, system 100 is configured such that an administrator, employer, contractor, or other authorized personnel can input and/or customize information relating to a customer in customer database 145, such as via a device 130.

In the embodiment shown, system 100, and more specifically processor 110 of system 100, is configured to receive a signal from first device 150, such as a signal relating to information about a worker. For example, system 100 can be configured to wirelessly receive a signal from first device 150, including via radio frequencies, such as with one or more antennas coupled to system 100. First device 150 can be any electronic device configured to send and/or receive a signal (e.g., with mobile application software), such as a mobile phone (e.g., a smart phone), a tablet, and a computer (e.g., a laptop computer). System 100 can be configured such that a customer of the services that a worker provides can use first device 150 to validate the worker.

System 100 can also comprise badge 160 having identifier 170. Badge 160 also can comprise visual identification of a worker, such as image 175 of a portion of the worker, and/or textual identification of the worker, such as a worker name and/or identification number. Identifier 170 can be any unique identifier configured to be linked to information associated with the individual (e.g., the worker) wearing or having badge 160. In some embodiments, identifier 170 is a visual identifier, such as quick response (QR) code, and is visible, for example, on the face of badge 160, as depicted in the embodiments shown; and in other embodiments, identifier 170 may be a non-visual identifier and is, for example, embedded in badge 160 such that identifier 170 is not directly visible on badge 160. Examples of such identifiers include, but are not limited to, radio frequency identification tags, linear bar codes (e.g., UPC codes), matrix bar codes (e.g., QR codes), and the like. An identifier is "linked to information" if the identifier represents the information and/or is otherwise associated with the information, which may be stored remotely from the identifier. Identifier 170 (and, more broadly, badge 160) is configured to be associated with a worker in system 100 by, for example, being linked to information relating to a worker in system 100, such as information stored in worker database 120 and/or scheduling database 140. Identifier 170 can be linked to, for example, information relating to worker name, worker identification number, employer name, employer identification number, and the like. In the embodiment shown, and as those of ordinary skill in the art will understand, first device 150 is configured to interface with and, at least in some embodiments, interpret identifier 170. First device 150 is also configured to send a signal to system 100 that is representative of the information to which identifier 170 is linked, or that can be associated, upon further processing, with the information to which identifier 170 is linked. First device 150 can interface with identifier 170 in any suitable way, such as, for example, by scanning, reading, or capturing identifier 170, including through the use of a hand scanner, a digital camera (e.g., a smart phone digital camera scanner), or a similar scanning, reading, and/or capturing device.

In the embodiment shown, system 100 is configured to validate (or authorize) a signal from first device 150 that is sent at some time during when, or after, first device 150 interfaces with identifier 170. System 100 (and, more specifically, processor 110) is configured to compare information associated with the signal from first device 150 with information in system 100, such as information in worker database 120 and/or scheduling database 140 relating to the worker. For example, if system 100 receives a signal relating to information about Worker A, such as Worker A's name and/or Worker A's identification number, processor 110 can compare Worker A's name and/or Worker A's identification number to information in worker database 120 and/or scheduling database 140 to determine whether the same or similar information exists in worker database 120 and/or scheduling database 140. Such a comparison can be used, for example, to determine if Worker A is an authorized worker. In this example, if processor 110 determines Worker A's name and/or Worker A's identification number exists in worker database 120 and/or scheduling database 140, processor 110 can further be configured to compare Worker A's schedule (e.g., in scheduling database 140) with a date and time to determine whether system 100 should be receiving a signal relating to Worker A. Information relating to date and time can be determined by system 100 or can be received by system 100, such as via a signal from first device 150. Any number of similar comparisons of information can be performed to validate a signal from first device 150 based on information from identifier 170, worker database 120, and/or scheduling database 140.

In the embodiment shown, system 100 is configured to provide information relating to a worker to first device 150 if system 100 receives a signal from first device 150 and if system 100 has information relating to the worker. System 100 (and, more specifically, processor 110) can be configured to provide information relating to a worker from worker database 120 and/or scheduling database 140, such as worker name, age, address, employer affiliations, contractor affiliations, licenses, certifications, background checks, educational history, employment history, dates of scheduled jobs, times of scheduled jobs, geographic locations of scheduled jobs, and similar job-specific information. For example, if system 100 receives a signal relating to information about Worker A, and system 100 cannot validate Worker A, system 100 can be configured such that first device 150 indicates that Worker A is not validated, meaning, for example, that Worker A is not authorized to work under the circumstances. In contrast, if system 100 receives a signal relating to information about Worker A, and system 100 validates Worker A, system 100 can be configured such that first device 150 indicates that Worker A is validated, meaning, for example, that Worker A is authorized to work under the circumstances. System 100 can also cause first device 150 to provide or display other information relating to Worker A, such as some or all of the information in system 100 (e.g., in worker database 120 and/or scheduling database 140) about Worker A.

In the embodiment shown, system 100, and more specifically processor 110, is also configured to receive a signal from second device 180, such as a signal relating to information about a worker. System 100 can be configured such that a general contractor can use second device 180 to perform any of a number of functions, such as clocking workers in and out, geo-locating workers, and/or retrieving and/or displaying information about a worker. For example, system 100 can be configured to wirelessly receive a signal from second device 180, including via radio frequencies, such as with one or more antennas coupled to system 100. Second device 180 can be any electronic device configured to send and/or receive signals (e.g., with mobile application software), such as a mobile phone (e.g., a smart phone), a tablet, and a computer (e.g., a laptop computer).

As described above, system 100 can comprise badge 160 having identifier 170. In the embodiment shown, second device 180 is configured to send at least one signal related to identifier 170. For example, second device 180 may be configured to clock-in and clock-out a worker carrying badge 160 from a given job. Second device 180 may do this using at least two signals, which may be the same or different (e.g., the signals may have different frequencies and/or represent different information). Second device 180 can interface with identifier 170 in any of the ways described above with respect to first device 150.

System 100 (and, more specifically, processor 110) is configured to compare information associated with a first signal and/or a second signal from second device 180 with information in system 100, such as information in worker database 120 and/or scheduling database 140. For example, if system 100 receives a first signal relating to information about Worker A from second device 180, such as Worker A's name and/or Worker A's identification number, processor 110 can compare Worker A's name and/or Worker A's identification number to information in worker database 120 and/or scheduling database 140 to determine whether the same or similar information exists in worker database 120 and/or scheduling database 140. Similarly, if system 100 receives a second signal relating to information about Worker A from second device 180, such as Worker A's name and/or Worker A's identification number, processor 110 can compare Worker A's name and/or Worker A's identification number to information in worker database 120 and/or scheduling database 140 to determine whether the same or similar information exists in worker database 120 and/or scheduling database 140. Processor 110 can be configured to clock-in or clock-out Worker A, depending on whether system 100 has received a first signal or a second signal, if processor 110 determines Worker A's name and/or Worker A's identification number exists in worker database 120 and/or scheduling database 140.

System 100 can be configured to clock-in and clock-out a worker in a variety of different ways. For example, in some embodiments, first device 150 can send first and second signals that relate to the date and time at which second device 180 interfaces with identifier 170. In other embodiments, system 100 can be configured to detect and/or store the date and time at which the first signal and/or the second signal from second device 180 are received by system 100.

In some embodiments, system 100 is configured to clock-in a worker if system 100 receives a first signal relating to the worker from second device 180, and system 100 is configured to clock-out the worker if system 100 receives a second signal relating to the worker from second device 180.

In some embodiments, system 100 is configured to receive a first signal relating to a worker from second device 180 if second device 180 interfaces with identifier 170 for a first time, and system 100 is configured to receive a second signal relating to the worker from second device 180 if second device 180 interfaces with identifier 170 for a second time. The first signal and the second signal from second device 180 can be distinguished in a variety of different ways, including by signal type and/or frequency (e.g., where the first signal and the second signal are not the same signal) or temporally with respect to a time at which second device 180 interfaces with identifier 170 (e.g., where the first signal and the second signal can be the same signal, but are not required to be).

System 100 can be configured to save and/or store information relating to a worker's status as clocked-in or clocked-out. In some embodiments, system 100 can be configured to provide such information to first device 150 and/or second device 180 such that first device 150 and/or second device 180 can display whether a worker is clocked-in or clocked-out. Further, system 100 can be configured to compare such information with information in worker database 120 and/or scheduling database 140 to determine whether a worker is working according to schedule, such as by determining whether a clock-in time associated with a signal accurately corresponds to a worker's scheduled start time on a given day and at a given job site.

System 100 can also be configured to detect a worker's geographic location. A worker's geographic location can include information relating to latitude and longitude, address, zip code, nearby intersections, name of geographic location (if any), and any mapping information relating to such information. For example, a signal from first device 150, a first signal from second device 180, and/or a second signal from second device 180 can relate to a worker's geographic location. Furthermore, system 100 can be configured to save and/or store information relating to a worker's geographic location. In some embodiments, system 100 can be configured to provide such information to first device 150 and/or second device 180 such that first device 150 and/or second device 180 can display information relating to a worker's geographic location. Further, system 100 can be configured to compare such information with information in worker database 120 and/or scheduling database 140 to determine whether a worker is at the correct job site, such as by determining whether a worker's geographic location associated with a signal accurately corresponds to a worker's scheduled geographic location on a given day and at a given job site.

In some embodiments, system 100 is further configured such that if system 100 receives a signal from first device 150, such as a signal relating to identifier 170 that associates badge 160 with information relating to a worker in system 100, system 100 provides information relating to the worker to second device 180. For example, a company can issue Worker A badge 160 having identifier 170 that associates badge 160 with information relating to Worker A in system 100. First device 150 can interface with Worker A's badge 160 such that a signal relating to identifier 170 is received by system 100. System 100 can then be configured to provide second device 180 with information relating to Worker A, such as information in worker database 120, scheduling database 140, and/or customer database 145. For example, in some embodiments, system 100 can be configured to provide second device 180 with information that first device 150 has interfaced with identifier 170 on Worker A's badge 160. As another example, system 100 can be configured to provide second device 180 with information that Worker A has been validated by system 100 or that Worker A has been clocked-in or clocked-out by system 100. As still another example, system 100 can also be configured to provide second device 180 with Worker A's geographic location.

Referring now to FIG. 2, shown therein and designated by the reference numeral 200 is another embodiment of a job site management system. System 200 is similar to system 100 in many ways. Some differences and similarities in system 200 with respect to system 100 are described here. While some differences in systems 100 and 200 are described, additional differences may be depicted in the figures. System 200 can be configured to perform the same or similar functions as system 100 even if not explicitly described in this paragraph. For example, in the embodiment shown in FIG. 2, system 200 (and, more specifically, processor 210) is configured to validate (or authorize) a signal from first device 250 that is sent at some time during when, or after, first device 250 interfaces with identifier 270 on badge 260. Badge 260 can have image 275 of a portion of the worker, and/or textual identification of the worker, such as a worker name and/or identification number. System 200 (and, more specifically, processor 210) is configured to do so by comparing information associated with the signal from first device 250, such as information relating to a worker who has badge 260, with information in system 200, such as information in worker database 220, scheduling database 240, or in a customer database (described in detail for system 100). System 200 (and, more specifically, processor 210) is configured to compare information associated with the signal from first device 250 with information in system 200, such as information in worker database 220, scheduling database 140, or a customer database relating to the worker. Further, system 200 (and, more specifically, processor 210) can be configured to provide information relating to a worker to first device 250, such as information from worker database 220 and/or scheduling database 240, which first device 250 can display or otherwise process. In the embodiment shown in FIG. 2, system 200 (and, more specifically, processor 215) is configured to clock-in or clock-out a worker, for example, by comparing information about the worker associated with a first signal and/or a second signal from second device 280 with information relating to the worker in system 200, such as information in worker database 220 and/or scheduling database 240. Also, system 200 (and, more specifically, processor 215) is configured to detect a worker's geographic location based on a first signal and/or a second signal received from second device 280.

This disclosure also comprises various methods for job site management. For example, one method comprises receiving a signal associated with information relating to a worker from a first device (e.g., first device 150 or first device 250, if first device 150 or first device 250 interfaces with an identifier), receiving another signal associated with information relating to the worker from a second device (e.g., second device 180 or second device 280, if second device 180 or second device 280 interfaces with an identifier), determining whether to validate the worker based on the signal received from the first device, providing information relating to the worker to the first device, and clocking-in the worker based on the first signal received from the second device. Such methods can further comprise receiving a second signal associated with information relating to the worker from the second device (e.g., if second device 180 or second device 280 interfaces with an identifier) and clocking-out the worker based on the second signal received from the second device. In some embodiments, the methods comprise detecting a geographic location of the worker based on at least one of the signals received from the second device.

The steps of methods or algorithms described in this disclosure may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art; all of these are examples of physical storage media. An exemplary storage medium is coupled to a processor such that the processor can read information from, and write information to, the storage medium. In the alternative, the storage medium may be integral to the processor. The processor and the storage medium may reside in an ASIC. The ASIC may reside in a user terminal. In some embodiments, the processor and the storage medium may reside as discrete components in a user terminal.

In one or more exemplary designs, the functions described may be implemented in hardware, software, firmware, or any combination thereof. If implemented in software, the functions may be stored as one or more instructions or code on a non-transitory computer-readable storage medium. A storage media may be any available media that can be accessed by a computer or processor. By way of example, and not limitation, such computer-readable media can comprise RAM, ROM, EEPROM, CD-ROM or other optical disk storage, magnetic disk storage or other magnetic storage devices, or any other non-transitory medium that can be used to store desired program code in the form of instructions or data structures and that can be accessed by a computer or a processor. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above should also be included within the scope of non-transitory computer-readable media.

The use of the foregoing technology allows for the processing of information (e.g., data) that is not possible without the aid of such technology, or at least not at the speed achievable with such technology. Some embodiments of the performance of the disclosed functions may be achieved automatically or otherwise within a certain amount of time, such as an amount of time less than what it would take to perform the function or functions without the use of a computer (or computer system), processor, or processors, including, for example and depending on the embodiment, no more than one hour, no more than 30 minutes, no more than 15 minutes, no more than 10 minutes, no more than one minute, no more than one second, and no more than every time interval in seconds between one second and one hour.

The above specification and examples provide a complete description of the structure and use of exemplary embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the systems and methods of this disclosure are not intended to be limited to the particular forms disclosed. Rather, they include all modifications and alternatives falling within the scope of the claims, and embodiments other than the one shown may include some or all of the features of the depicted embodiment. For example, components may be combined as a unitary structure and/or connections may be substituted. Further, where appropriate, aspects of any of the examples described above may be combined with aspects of any of the other examples described to form further examples having comparable or different properties and addressing the same or different problems. Similarly, it will be understood that the benefits and advantages described above may relate to one embodiment or may relate to several embodiments.

The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A system for validating, and for enabling a consumer to verify an identity of, a worker having a badge, comprising:
   said badge, comprising an identifier configured to associate the badge with information relating to a worker in the system; and
   one or more processors configured to:
      determine whether to validate the worker having the badge after a consumer device that is carried by the consumer, geographically remote from the one or more processors and connected to a different local network than the one or more processors, interfaces with the identifier and sends a signal relating to the identifier;
      clock-in the worker having the badge if the system receives a first signal relating to the identifier from a worker device carried by the worker having the badge;
      clock-out the worker having the badge if the system receives a second signal relating to the identifier from the worker device; and
      at least one of:
         provide, prior to the worker clocking out, one or more of text, numbers, and an image from a worker database relating to the worker for display on at least one of the consumer and worker devices; and cause one or more of text, numbers, and an image to be displayed on at least one of the consumer and worker devices that was input into the system by the worker.

2. The system of claim 1, where the one or more processors are configured to determine whether to validate a worker by comparing information linked to the identifier with information in the system.

3. The system of claim 2, further comprising a scheduling database coupled to the one or more processors and comprising information relating to a schedule of a worker, and where the one or more processors are configured to determine whether to validate a worker by comparing information linked to the identifier with information in the scheduling database.

4. The system of claim 1, where the identifier comprises a matrix bar code.

5. The system of claim 1, where the identifier comprises a radio frequency identification tag.

6. The system of claim 1, the one or more processors being configured to clock-out the worker having the badge if the system receives the second signal relating to the identifier from the worker device, where the second signal from the worker device represents the same information as the first signal.

7. The system of claim 1, where the system is configured to detect the time at which the first signal from the worker device is received.

8. The system of claim 7, where the system is configured to detect the time at which the second signal from the worker device is received.

9. The system of claim 1, where the one or more processors are further configured to detect the worker's geographic location based on a signal received from the consumer device or the worker device.

10. The system of claim 1, further configured such that if the system receives a signal from the consumer device, the system provides information relating to the worker to the worker device.

11. A system for validating, and for enabling a consumer to verify an identity of, a worker having a badge, comprising:

said badge comprising an identifier configured to associate the badge with information stored in a worker database and relating to a worker in the system; and one or more processors configured to:
determine whether to validate the worker having the badge after a consumer device that is carried by the consumer, geographically remote from the one or more processors and connected to a different local network than the one or more processors, interfaces with the identifier and sends a signal relating to the identifier;

detect the worker's geographic location based on a signal received from a worker device carried by the worker having the badge;

provide for display on the consumer device prior to the worker clocking out, at least a portion of the information from the worker database relating to the worker that is sufficient to enable the consumer to verify the identity of the worker, the provided information including at least an image of the worker in the system; and cause the consumer device to display the provided information that the worker inputted into the system.

12. The system of claim 11, where the information relating to a worker comprises at least one of name, age, address, employer affiliations, contractor affiliations, licenses, certifications, background checks, educational history, and employment history.

13. The system of claim 11, where the one or more processors are configured to determine whether to validate a worker by comparing information linked to the identifier with information in the system.

14. The system of claim 13, further comprising a scheduling database coupled to the one or more processors and comprising information relating to a schedule of a worker, and where the one or more processors are configured to determine whether to validate a worker by comparing information linked to the identifier with information in the scheduling database.

15. The system of claim 11, where the system is configured to detect the time at which the signal from the worker device is received.

16. The system of claim 11, where the one or more processors are further configured to:
clock-in the worker having the badge if the system receives a first signal relating to the identifier from the worker device; and
clock-out the worker having the badge if the system receives a second signal relating to the identifier from the worker device.

17. The system of claim 11, further configured such that if the system receives a signal from the consumer device, the system provides information relating to the worker to the worker device.

18. A system for validating, and for enabling a consumer to verify an identity of, a worker having a badge, comprising:

said badge, comprising an identifier configured to associate the badge with information stored in a worker database and relating to a worker in the system;

a scheduling database comprising information relating to a schedule of the worker in the system;

one or more processors coupled to the scheduling database and configured to:
receive a signal relating to the identifier after a consumer device that is carried by the consumer, geographically remote from the one or more processors and connected to a different local network than the one or more processors, interfaces with the identifier;

determine whether to validate the worker having the badge, wherein determining whether to validate the worker having the badge includes comparing information linked to the identifier with information in the scheduling database;

detect the geographic location of the worker having the badge based on a signal received from a worker device carried by the worker having the badge;

provide for display on the first device prior to the worker clocking out, at least a portion of the information from the worker database relating to the worker that is sufficient to enable the consumer to verify the identity of the worker, the information including at least an image of the worker in the system;

cause the consumer device to display the received information that the worker inputted into the system; and provide the at least a portion of the information from the worker database relating to the worker that is sufficient to enable the consumer to verify the identity of the worker to the worker device.

19. The system of claim 18, wherein the at least a portion of the information from the worker database relating to the worker that is sufficient to enable the consumer to verify the identity of the worker further comprises at least one of name, age, address, employer affiliations, contractor affiliations, licenses, certifications, background checks, educational history, and employment history.

20. The system of claim 18, wherein the one or more processors are further configured to:
- clock-in the worker having the badge if the system receives a first signal relating to the identifier from the worker device; and
- clock-out the worker having the badge if the system receives a second signal relating to the identifier from the worker device.

\* \* \* \* \*